(12) United States Patent
Paulino

(10) Patent No.: US 8,256,202 B1
(45) Date of Patent: Sep. 4, 2012

(54) HIGH BYPASS TURBOFAN

(75) Inventor: Joseph R Paulino, West Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 800 days.

(21) Appl. No.: 12/277,541

(22) Filed: Nov. 25, 2008

(51) Int. Cl.
*F02C 1/06* (2006.01)
(52) U.S. Cl. .................................. 60/39.17; 60/226.1
(58) Field of Classification Search .............. 60/39.17, 60/39.37, 226.1, 262, 791, 241
See application file for complete search history.

(56) References Cited

U.S. PATENT DOCUMENTS

| | | | | |
|---|---|---|---|---|
| 3,418,808 | A | * | 12/1968 | Rich .......................... 60/226.1 |
| 4,085,583 | A | * | 4/1978 | Klees ............................... 60/204 |
| 4,214,610 | A | * | 7/1980 | James et al. .................. 137/597 |
| 4,592,204 | A | | 6/1986 | Rice |
| 4,896,499 | A | | 1/1990 | Rice |
| 5,347,806 | A | | 9/1994 | Nakhamkin |
| 5,386,688 | A | | 2/1995 | Nakhamkin |
| 5,485,717 | A | | 1/1996 | Williams |
| 5,768,884 | A | | 6/1998 | Hines |
| 6,385,959 | B1 | * | 5/2002 | Montoya ......................... 60/773 |
| 6,701,717 | B2 | | 3/2004 | Flatman et al. |
| 6,735,951 | B2 | | 5/2004 | Thompson |
| 6,817,187 | B2 | * | 11/2004 | Yu .................................... 60/774 |
| 6,865,891 | B2 | | 3/2005 | Walsh et al. |
| 7,363,757 | B2 | | 4/2008 | Loisy |
| 8,006,477 | B2 | * | 8/2011 | Dinu ............................. 60/39.17 |
| 2009/0211221 | A1 | * | 8/2009 | Roberge ....................... 60/226.1 |

\* cited by examiner

*Primary Examiner* — Phutthiwat Wongwian
(74) *Attorney, Agent, or Firm* — John Ryznic

(57) ABSTRACT

A high bypass flow turbofan engine in which the fan is driven by a fan turbine uncoupled from the core engine so that a lower speed can be used to drive a fan blade that is larger in diameter than the prior art fans. A low pressure compressor is driven by a low pressure turbine, and a high pressure compressor is driven by a high pressure turbine. Some of the high pressure air from the high pressure compressor is diverted into a second combustor to produce a hot gas flow that is delivered into the fan turbine to drive the fan. The remaining high pressure air from the high pressure compressor flows into the first combustor to produce the hot gas flow that drives the low and high pressure turbines. Because the fan turbine is uncoupled from the core engine, the fan turbine can be smaller to save weight and so that none of the bypass flow is blocked, further increasing the efficiency of the engine. The fan is uncoupled from the core engine so that the fan speed can be regulated independent from the core engine speed.

26 Claims, 2 Drawing Sheets

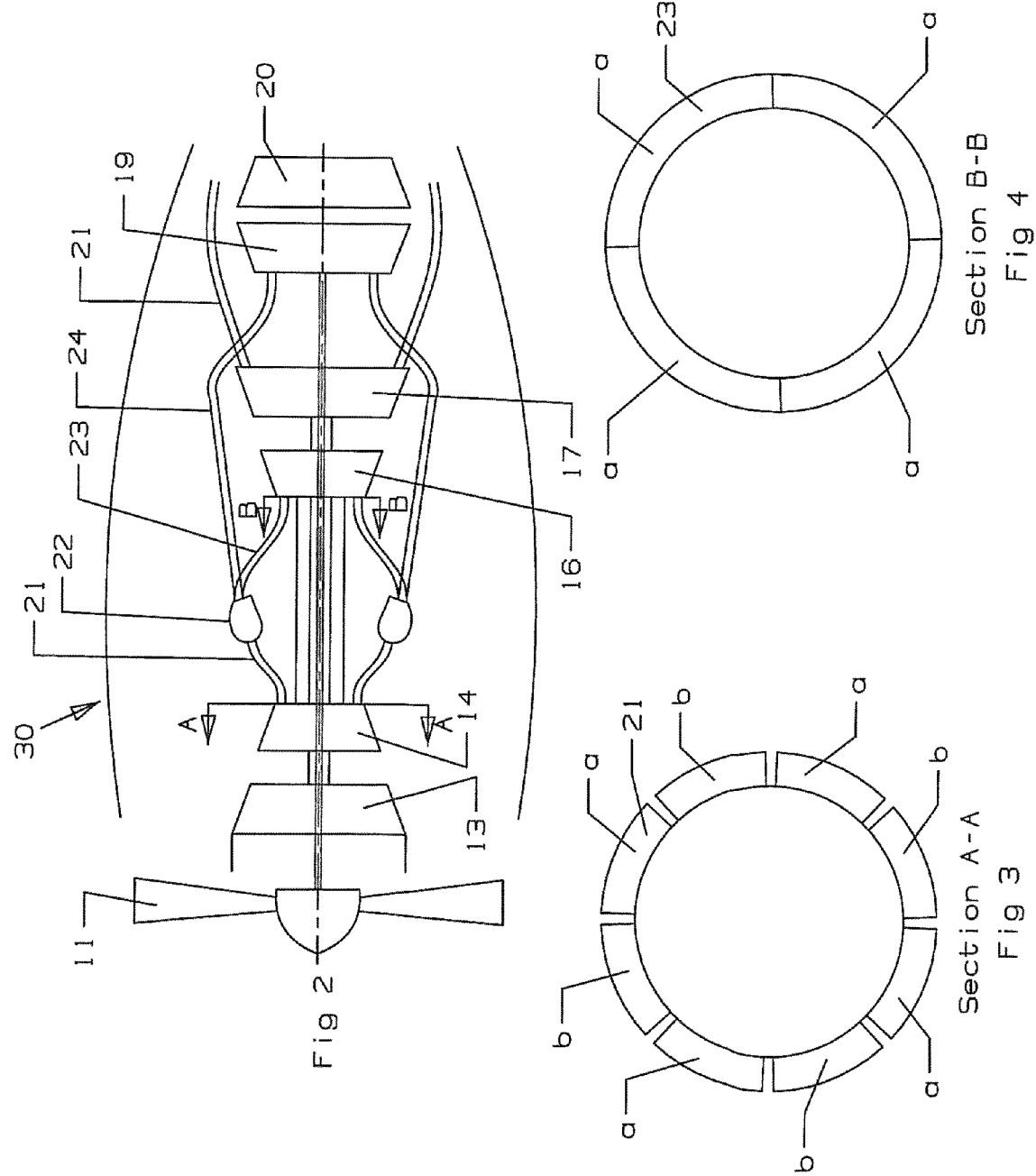

HIGH BYPASS TURBOFAN

FEDERAL RESEARCH STATEMENT

None.

CROSS-REFERENCE TO RELATED APPLICATIONS

None.

BACKGROUND OF THE INVENTION

1. Field of the Invention

The present invention relates generally to a gas turbine engine, and more specifically to a an aero gas turbine engine with a bypass fan.

2. Description of the Related Art Including Information Disclosed Under 37 CFR 1.97 and 1.98

An aircraft engine is powered by a multiple spool gas turbine engine that includes a bypass fan driven by the low pressure turbine. In a twin spool engine, the bypass fan functions also as the low pressure compressor to supply compressed air to an inlet of a high pressure compressor. The combustor produces a hot gas flow that enters into a high pressure turbine and then a low pressure turbine. The high pressure turbine is rotatably connected to the high pressure turbine to drive it, while the low pressure turbine drives the low pressure compressor which is also the bypass fan.

The fan tip speed is a limiting factor in the design and operation of the engine. Since the fan is directly coupled to the low pressure turbine, the bypass fan operates at the same rotational speed as the low pressure turbine. It is desirable to use as large a bypass fan as possible. However, the size of the bypass fan is dependent upon the size of the turbine blades that drive the fan. To make use of a large turbine fan blade to drive the fan is not desirable because the large diameter turbine would block some of the bypass air flowing through the engine. It is desirable to provide a small low pressure turbine to drive the fan. This would also decrease the size of the overall engine and reduce the weight, both beneficial to improving the overall performance of the turbofan engine.

Another problem with the prior art turbofan engines is that the fan is driven by a turbine that is coupled with the core part of the engine—the high pressure turbine and the low pressure turbine—which is supplied by hot gas flow from the same combustor. Thus, the fan is driven by the combustion gas flow from the combustor that also supplies the core turbines. Since the speed of the low pressure turbine is related to the speed of the high pressure turbine, in this prior art turbofan engine, when the speed of the high pressure turbine increases the speed of the low pressure turbine, and thus the fan, must also increase. The fan speed cannot be separated from the core engine speed.

BRIEF SUMMARY OF THE INVENTION

It is an object of the present invention to provide for a turbofan engine with a smaller low pressure turbine that is used to drive the bypass fan.

It is another object of the present invention to provide for a turbofan engine with a larger diameter fan that that in the cited prior art references.

It is another object of the present invention to provide for a turbofan engine with a fan that is fully decoupled from the core compressors and turbine of the engine.

The present invention is a turbofan engine with a large fan that is fully decoupled from the compressors and turbines of the engine and is driven by a fan turbine that is supplied with a hot gas flow from a separate combustor from the core engine. The high pressure compressor supplies a portion of the high pressure air to the fan turbine combustor. The low pressure turbine exhaust bypasses the fan turbine to join with the exhaust of the turbine fan and the bypass air at the engine outlet. The present invention allows for the bypass fan to be larger than the prior art and to be driven by a lower speed turbine because the fan turbine is uncoupled from the core engine. With this design, the fan turbine can be smaller so as not to block the bypass air flow through the engine or to create a larger cross sectional area in the turbine than in the fan. A smaller turbine section is possible and a larger bypass fan diameter over the prior art.

In another embodiment, the high pressure compressor discharges the compressed air into a transition duct/combustor assembly that forms a first hot gas passage for the first high pressure turbine and a second hot gas flow passage for the fan turbine. The transition duct/combustor is formed with a series of alternating inlets having a full annular arrangement to receive the compressed air from the high pressure compressor in which the first set of inlets channels to hot gas to a first location and the second set of inlets channels the hot gas flow to a second downstream location. In this embodiment, the combustor is formed as part of the transition duct.

BRIEF DESCRIPTION OF THE SEVERAL VIEWS OF THE DRAWINGS

FIG. 2 shows a cross section view of a second embodiment of the bypass fan of the present invention.

FIG. 3 shows a schematic view of the transition and combustor device of the second embodiment of the present invention.

FIG. 4 shows a cross section end view of the outlet end of the transition duct assembly for the high pressure turbine with only ducts (a).

DETAILED DESCRIPTION OF THE INVENTION

Figure 1:
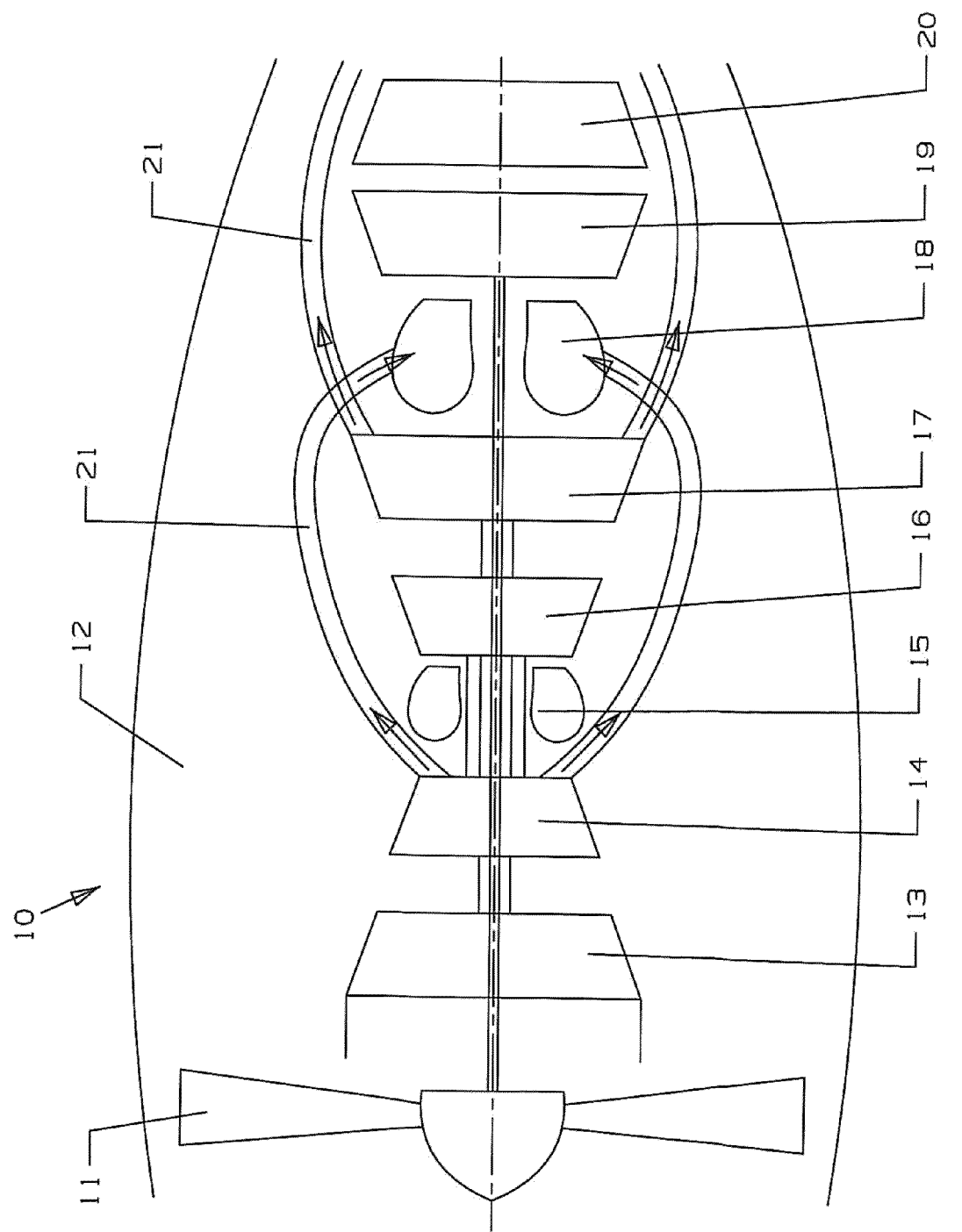
FIG. 1 shows a cross section view of the bypass fan of the present invention.

The present invention is a multiple spool gas turbine engine with a bypass fan that is used for aircraft propulsion. FIG. 1 shows the engine 10 with a fan 11 connected by a rotor shaft to a fan turbine 19 at the other end of the engine, a bypass channel 12 for the air flow driven by the fan 11, a low pressure compressor 13 connected by a second rotor shaft to a low pressure turbine 17, a high pressure compressor 14 connected by a third rotor shaft to a high pressure turbine 16, a first combustor 15 positioned between the high pressure compressor 14 and the high pressure turbine 16, and a second combustor 18 positioned between the low pressure turbine 17 and the fan turbine 19. A nozzle 20 is located aft of the fan turbine 19 to discharge a fan drive stream from the fan turbine 19. The compressors 13 and 14 can be either axial flow or radial flow, and the combustors can be an annular combustor or a plurality of annular arranged can combustors.

A first bypass passage 21 delivers some of the compressed air from the high pressure compressor 14 to the second combustor 18 that produces a hot gas flow for the fan turbine 19. A second bypass passage 22 channels the exhaust flow exiting the low pressure turbine 17 out and around the second combustor 18 and the fan turbine 19, discharging the exhaust gas out the exit of the engine to be mixed with the bypass flow 12 and the fan turbine 19 exhaust. The first and second bypass passages 21 and 22 are not fully annular but formed of a plurality of tubes or passages interweaved with each other between the low pressure turbine 17 and the second combustor 18.

The operation of the high bypass turbofan of FIG. 1 is as follows. The fan 11, driven by the fan turbine 19, compresses the engine inlet air in which a portion passes into the inlet, of the low pressure compressor 13 and then into the high pressure compressor 14. The remaining air from the fan passes through the bypass channel 12 and exits the engine at the exit end. Some of the high pressure air from the high pressure compressor 14 is delivered into the first combustor 15 and burned with a fuel to produce a hot gas flow that enters the high pressure turbine 16 which drives the high pressure compressor 14. The exhaust from the high pressure turbine 16 then flows into the low pressure turbine 17 which drives the low pressure compressor 13. The exhaust from the low pressure turbine 17 is channeled around the second combustor 18 and the fan turbine 19 by the second bypass passage to be discharged out the exit end of the engine 10.

The remaining high pressure air from the high pressure compressor 14 that does not flow into the first combustor 15 is delivered into the second combustor 18 through the first bypass passage 21 to be burned with a fuel to produce a hot gas flow that enters into the fan turbine 19 to drive the fan 11. The exhaust from the fan turbine 19 is passed through a nozzle 20 and then discharged out the exit end of the engine.

Because the fan is driven by a turbine uncoupled from the core engine—which is considered to be the low and high pressure compressors 13 and 14 and turbines 16 and 17—the fan turbine 19 can be no larger than the low pressure turbine 17 in order to reduce the size of the fan turbine 19 so as not to obstruct the bypass flow from the fan 11 and to reduce the weight of the engine 10. Also, the fan 11 can be made larger in height because the hot gas flow that drives the fan turbine 19 is not the lower pressure hot gas flow from a prior art engine which uses the low pressure turbine, and because the fan turbine 19 operates at a lower speed than the low pressure turbine 17 that normally would be used to drive the fan 11. Another feature of the invention is that the fan turbine 19 inlet is the same diameter as the low pressure turbine 17 inlet or about the same diameter. It is desirable to have the smallest possible turbine in the aft end of the engine in order to reduce weight of the engine and to prevent blocking of the bypass air from the fan 11.

FIG. 2 shows a second embodiment of the present invention in which the engine 30 includes individual combustors and the high pressure air channels that channel the high compressor air outlet to the two combustors. In the FIG. 2 embodiment, the combustors 22 are formed as an integral part with the transition channels (21, 23,24) that channel the compressed air from the high pressure compressor 14 and the hot gas flow produced by combustion to the respective turbines (16, 17, 19). The transition/combustor assembly includes an annular array of inlet sections (a,b) that alternate from discharging to the high pressure turbine 16 and the fan turbine 19 so that a full 360 degree array of inlets are formed and collect the high pressure compressor 14 outlet air. Thus, the transition/combustor assembly alternates in a series as a-b-a-b-a-b (as seen in FIG. 3) with an equal number of inlets for (a) as for (b). The inlet cross sectional area for (a) and (b) may be distributed as needed for the required flow or power distribution between the high pressure turbine (16,17) and the fan turbine 19. At the outlet end of the (a) section is also an annular array of outlets (see FIG. 4) that form a full 360 degree annular arrangement of outlets to be discharged into the inlet of the high pressure turbine 16. The outlet ducts (FIG. 4) form a full 360 degree annular outlet as seen in FIG. 4. The outlet ducts (b) discharge at a further downstream location than the outlet ducts (a) in order to discharge the hot gas flow into the fan turbine 19. As in the ducts (a), the outlet ducts (b) complete a full 360 degree arrangement for the outlet.

As in the FIG. 1 embodiment, the FIG. 2 embodiment operates similarly. The fan 11 is driven by the fan turbine 19 which is separate from the high pressure and low pressure turbines 16 and 17. Compressed air from the high pressure compressor 14 flows into the annular arrangement of inlet ducts (a) and (b) in which the compressed air in duct (a) is burned with a fuel at an independent fuel/air ratio from ducts (b) to produce the hot gas flow that then exits out through outlet ducts (a) and flows into the high pressure turbine 16 and then the low pressure turbine 17 to drive the compressors 13 and 14. The compressed air than flows into the second inlet ducts (b) is burned with a fuel and then flows out the outlet ducts (b) and into the fan turbine 19 to drive the fan 11. In this embodiment, the amount of compressed air divided between the two ducts (a) and (b) can be equal. However, the compressed air can be increased to one duct by forming the one inlet (a) duct larger than the other inlet duct (b) to control the amount of compressed discharged in favor of one turbine. The FIG. 2 embodiment also eliminates the need for separate combustors or can combustors by integrating the combustors with the transition ducts.

Because the transition ducts both connect to the high pressure compressor, the combustors in the first ducts and the second ducts are located at around the same location and thus form an annular array of combustors. The outlet ducts then break away and deliver the hot gas flow to the respective turbines at different locations.

FIG. 3 shows a cross section front view of the inlet end of the transition ducts assembly with both ducts (a) and (b), and FIG. 4 shows a cross section end view of the outlet end of the transition duct assembly for the high pressure turbine with only ducts (a). In this embodiment, the inlet ends of the ducts are of the same cross sectional area and arc length, and thus the two ducts split the air flow from the compressor.

Thus, in both the embodiment in FIGS. 1 and 2, the shaft connecting the fan 11 to the fan turbine 19 is a separate shaft from the high pressure turbine 16 and the low pressure turbine 17. As the speed of the high pressure turbine shaft increases, the speed of the low pressure turbine shaft must also increase to maintain the performance of the core engine. A combustor assembly—either an annular combustor or a ring of can combustors—supplies the hot gas flow to both turbines in the core engine. With the present invention, the speed of the fan shaft can be regulated independent of the core engine shafts so that the fan 11 can be driven at a desired speed without depending upon the shaft speed of the core engine—the high speed shaft and the low speed shaft. The fan turbine 19 is driven by a second combustor assembly that is separate from the first combustor assembly that drives the core engine. This is a major improvement over the turbofan engines of the prior art.

I claim the following:

1. A high bypass flow turbofan comprising:
   a bypass fan rotatably connected to a fan turbine;
   a low pressure compressor rotatably connected to a low pressure turbine;
   a high pressure compressor rotatably connected to a high pressure turbine;
   a first combustor to produce a hot gas flow for the high pressure turbine and the low pressure turbine;

a second combustor to produce a hot gas flow to supply to the fan turbine; and, means to deliver compressed air from the high pressure compressor into both the first combustor and the second combustor.

2. The high bypass flow turbofan of claim 1, and further comprising:
all of the compressed air from the high pressure compressor flows into the first and second combustors.

3. The high bypass flow turbofan of claim 1, and further comprising: a diameter of the fan turbine inlet is small than a diameter of the low pressure turbine inlet.

4. The high bypass flow turbofan of claim 1, and further comprising:
the means to deliver compressed air from the high pressure compressor includes a splitter that channels a portion of the compressed air to the second combustor.

5. The high bypass flow turbofan of claim 1, and further comprising:
the fan turbine operates at a lower rotational speed than the low pressure turbine.

6. The high bypass flow turbofan of claim 1, and further comprising: a nozzle connected to an aft end of the fan turbine to discharge the fan turbine exhaust.

7. The high bypass flow turbofan of claim 1, and further comprising: the bypass fan is uncoupled from the low and high pressure turbines.

8. The high bypass flow turbofan of claim 1, and further comprising:
the fan turbine is supplied with hot gas flow from a combustor separate from the combustor for the low and high pressure turbines.

9. The high bypass flow turbofan of claim 1, and further comprising:
the means to deliver compressed air from the high pressure compressor includes a transition duct and combustor assembly having an annular array of inlet ducts alternating from a first duct to a second duct, an annular array of outlet first ducts and an annular array of second outlet ducts located aft of the array of first ducts.

10. The high bypass flow turbofan of claim 9, and further comprising:
the annular array of first and second alternating ducts form a full 360 degree array.

11. The high bypass flow turbofan of claim 9, and further comprising: a cross sectional area of the first inlet ducts is equal to the second inlet ducts.

12. The high bypass flow turbofan of claim 9, and further comprising: the annular array of the first and second outlet ducts form a full 360 degree array.

13. The high bypass flow turbofan of claim 9, and further comprising:
the array of first inlet and outlet ducts includes the first combustor and delivers the hot gas flow to the high pressure turbine; and,
the array of second inlet and outlet ducts includes the second combustor and delivers the hot gas flow to the fan turbine.

14. A process for driving a bypass fan of a turbofan engine, the steps comprising:
compressing air in a low pressure compressor that rotatably connected to a low pressure turbine to produce a low pressure air;
compressing the low pressure air in a high pressure compressor and delivering a portion of a high pressure air into a first combustor to produce a first hot gas flow;
delivering a remaining high pressure air from the high pressure compressor into a second combustor to produce a second hot gas flow;
passing the first hot gas flow through a high pressure turbine and then a low pressure turbine to drive the high pressure compressor; and
passing the second hot gas flow through a fan turbine that disposed downstream from the low pressure turbine to drive the bypass fan.

15. The process for driving a bypass fan of a turbofan engine of claim 14, and further comprising the step of:
operating the fan turbine at a lower rotational speed than the low pressure turbine.

16. The process for driving a bypass fan of a turbofan engine of claim 15, and further comprising the step of:
discharging an exhaust gas from the low pressure turbine around the second combustor and the fan turbine.

17. The process for driving a bypass fan of a turbofan engine of claim 14, and further comprising the step of:
uncoupling the fan turbine from the low pressure turbine and the high pressure turbine such that the fan speed can vary without varying the low or high pressure turbines.

18. The process for driving a bypass fan of a turbofan engine of claim 14, and further comprising the step of:
supplying a hot gas flow to the fan turbine from a separate combustor that supplies a hot gas flow to the low and high pressure turbines.

19. A transition duct and combustor assembly for use in a gas turbine engine to channel and diffuse compressed air from a compressor, produce a hot gas flow with a fuel, and deliver the hot gas flow to a turbine section, the transition duct and combustor assembly comprising:
an annular array of first inlet ducts having a first arc length to receive the compressed air from the compressor;
an annular array of first outlet ducts having a second arc length;
a first combustor formed within each of first ducts and located between the inlet and the outlet of the first duct to produce a first hot gas and supply to turbine section;
the annular array of the first outlet ducts forming a full 360 degree annular array;
an annular array of second inlet ducts having a third arc length receive the compressed air from the compressor;
the second inlet ducts spaced between the first inlet ducts to form a full 360 degree array of inlet ducts;
an annular array of second outlet ducts having a fourth arc length;
a second combustor formed within each of the second ducts and located between the inlet and the outlet of second duct to produce a second hot gas and supply to the turbine section; and,
the annular array of second outlet ducts forming a full 360 degree annular array.

20. The transition duct and combustor assembly of claim 19, and further comprising: the second outlet ducts being located aft of the first outlet ducts.

21. The transition duct and combustor assembly of claim 19, and further comprising:
a cross sectional area of the first inlet ducts is about equal to the second inlet ducts.

22. The transition duct and combustor assembly of claim 19, and further comprising:
the first combustors and the second combustors form an annular array of combustors.

23. A high bypass flow turbofan comprising:
a bypass fan rotatably connected to a fan turbine;

a low pressure compressor rotatably connected to a low pressure turbine; a high pressure compressor rotatably connected to a high pressure turbine;

a first combustor to produce a hot gas flow for the high pressure turbine and the low pressure turbine;

a second combustor to produce a hot gas flow to supply to the fan turbine;

means to deliver compressed air from the high pressure compressor into both the first combustor and the second combustor; and, the diameter of the fan turbine inlet is smaller than the diameter of the low pressure turbine inlet.

24. A high bypass flow turbofan comprising:

a bypass fan rotatably connected to a fan turbine;

a low pressure compressor rotatably connected to a low pressure turbine;

a high pressure compressor rotatably connected to a high pressure turbine;

a first combustor to produce a hot gas flow for the high pressure turbine and the low pressure turbine;

a second combustor to produce a hot gas flow for the fan turbine;

means to deliver compressed air from the high pressure compressor into both the first combustor and the second combustor; and, the means to deliver compressed air from the high pressure compressor includes a splitter that channels a portion of the compressed air to the second combustor.

25. A high bypass flow turbofan comprising:

a bypass fan rotatably connected to a fan turbine;

a low pressure compressor rotatably connected to a low pressure turbine;

a high pressure compressor rotatably connected to a high pressure turbine;

a first combustor to produce a hot gas flow for the high pressure turbine and the low pressure turbine;

a second combustor to produce a hot gas flow to supply to the fan turbine;

means to deliver compressed air from the high pressure compressor into both the first combustor and the second combustor; and, the fan turbine operates at a lower rotational speed than the low pressure turbine.

26. A high bypass flow turbofan comprising:

a bypass fan rotatably connected to a fan turbine;

a low pressure compressor rotatably connected to a low pressure turbine;

a high pressure compressor rotatably connected to a high pressure turbine;

a first combustor to produce a hot gas flow for the high pressure turbine and the low pressure turbine;

a second combustor to produce a hot gas flow for the fan turbine;

means to deliver compressed air from the high pressure compressor into both the first combustor and the second combustor; and, the fan turbine is supplied with hot gas flow from a separate combustor from the combustor for the low and high pressure turbines.

\* \* \* \* \*